Figure 1:
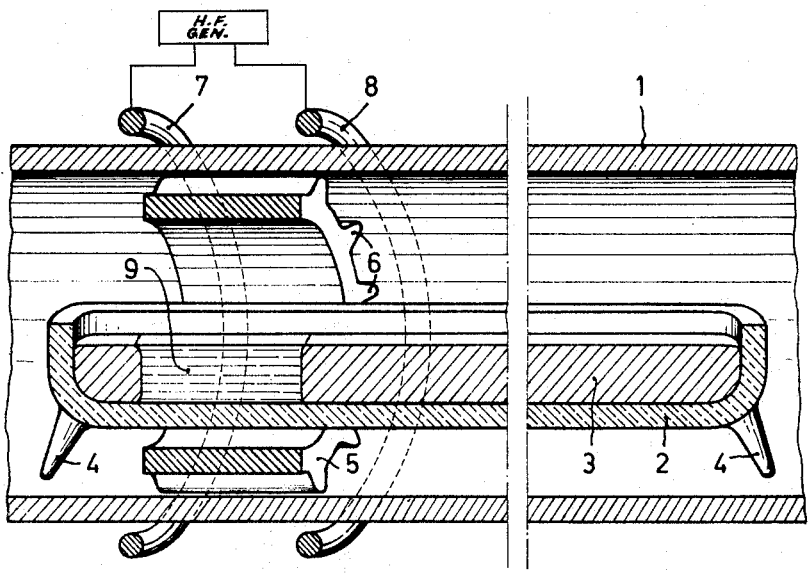

March 10, 1964  A. M. J. G. VAN RUN  3,124,633
METHOD OF, AND APPARATUS FOR, MOVING-ZONE
HEAT TREATMENT OF MATERIALS
Filed Sept. 14, 1961

INVENTOR
ADRIANUS M.J.G. VAN RUN

BY
AGENT

United States Patent Office 3,124,633
Patented Mar. 10, 1964

3,124,633
METHOD OF, AND APPARATUS FOR, MOVING-ZONE HEAT TREATMENT OF MATERIALS
Adrianus Martinus Jacobus Gerardus Van Run, Eindhoven, Netherlands, assignor to North American Philips Company, Inc., New York, N.Y., a corporation of Delaware
Filed Sept. 14, 1961, Ser. No. 138,110
Claims priority, application Netherlands Sept. 15, 1960
8 Claims. (Cl. 13—1)

The invention relates to a method of, and an apparatus for, moving-zone heat treatment of materials by means of an electrically conducting heating ring surrounding part of a charge of such a material, which ring is moved relatively to that charge in the direction of length thereof and is inductively heated by means of a high-frequency electromagnetic field. The term "moving-zone heat treatment" is used herein to signify a method in which a charge of a material, which substantially extends in one dimension, for example a rod or a powder distributed in an elongated crucible throughout the length thereof, is heated along part of the length of the charge, the heated zone being passed along the charge. A widely known form of moving-zone heat treatment is, for example, the zone melting process, which is described inter alia by W. G. Pfann, in his book "Zone Melting" (John Wiley and Sons, Inc., 1958), and is used in the treatment of fusible materials, in particular semi-conductive materials, for example to purify them, to dope them with a significant impurity and/or to convert them into single crystals.

In a known embodiment of the above mentioned method, the heating ring is displaced mechanically by means of a guiding rod secured to the ring. However, the use of such a rod has disadvantages. The rod is a source of heat losses for the heated ring and it may be heated, at least for part of its length, to a temperature such that undesirable impurities are evapoarted from the rod and poison the atmosphere surrounding the material to be treated. Another difficulty consists in that the material to be treated and the heating ring are frequently disposed in a chamber from which the ambient atmosphere is excluded. In this event, the control rod for guiding the heating ring has to pass through the chamber wall in a gas-tight manner allowing free movement, and this renders the apparatus complicated and increases the risk of leakage and hence of contamination of the material to be treated.

It is an object of the present invention to obviate these difficulties. It utilizes the fact that owing to the induction currents produced in an annular conductor by an electromagnetic field, forces are exerted on this conductor which tend to move it in a direction in which the field strength decreases. In the method according to the invention, the displacement of the ring is effected with the aid of the forces exerted by the high-frequency electromagnetic field.

Preferably, the electromagnetic field is built up so that the components of its field strength in the direction of length of the charge show a local minimum, while the field is gradually changed, for example is shifted as a whole, so that this minimum is displaced in the direction of length of the charge. Such a field exerts forces on the ring which drive the ring towards the minimum, where these forces cancel out. Hence, the ring will follow the displacement of this minimum. Such a field is preferably produced by means of at least two high-frequency coils which are adapted to move relatively to the charge in the direction of length thereof and, viewed in the direction of length, lie one behind the other one on this direction of length, lie one behind the other one on either side of the heating ring. When the two coils are displaced together in the direction of length of the charge, the ring lying between these coils is also displaced. Preferably, the partial fields generated by each of the coils have same direction so that the total field strength in the area corresponding to the ring is a maximum, and an optimum transfer of energy to the ring for its heating is ensured, as will be explained more fully hereinafter. For this purpose, the two coils have to pass high-frequency currents of the same frequency in the same sense.

The invention further relates to an apparatus for moving-zone heat treatment of materials, which comprises at least one holder for an elongated charge of such a material, an electrically conducting heating ring which is adapted to be displaced relatively to said charge in the direction and are additive of length thereof, and at least one high-frequency coil for supplying energy to the ring, which coil is also adapted to be displaced in a similar manner. According to the invention, such an apparatus is characterized in that it comprises two high-frequency coils which, when viewed in the direction of length of the charge, lie one behind the other, are adapted to be moved and are disposed one on either side of the heating ring.

The axis of this ring is held at least substantially parallel to the direction of length of the charge, preferably by means of at least one guide member extending in the direction of length of the charge. This guide member preferably is a cylindrical tube in which the ring fits with a small amount of clearance and which also in known manner constitutes a wall of a chamber in which the atmosphere can be controlled. The coils are preferably provided in known manner on this tube so that they can readily be controlled from outside.

In order that the invention may readily be carried out, an embodiment thereof will now be described, by way of example, with reference to the accompanying diagrammatic drawing, in which—

Figure 2:
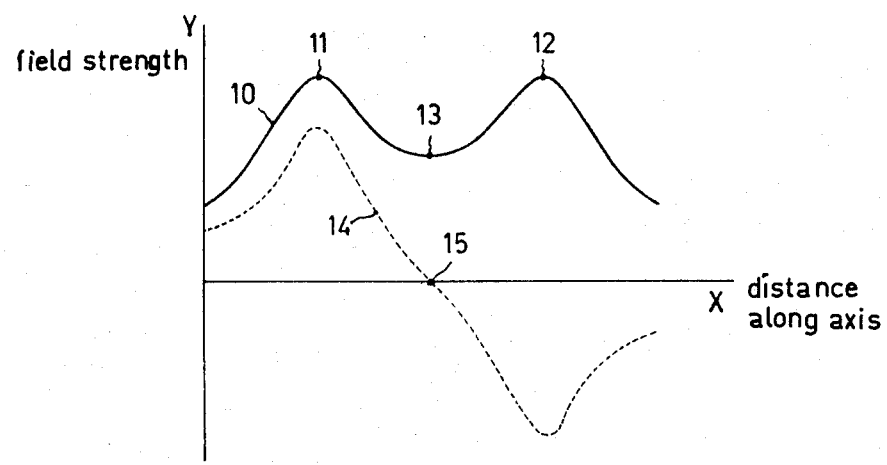

FIGURE 1 is a part vertical sectional view, part perspective view of an apparatus for moving-zone heat treatment, and FIGURE 2 is a graph of the variation of the field strength of the electromagnetic field produced by the two coils of FIG. 1.

In FIG. 1, a tube 1 of vitreous quartz is provided at its not shown end with gas-tight sealing members, which may be provided with apertures for the introduction and discharge of gases. The tube contains an elongated crucible 2, which may be made of quartz or another refractory material, preferably of poor electrical conductivity, in which a charge of a material 3 to be treated, for example semi-conductive material, such as germanium, silicon or a compound of the type $A^{III}B^V$ or $A^{II}B^{VI}$, is provided in elongated form. The crucible 2 bears on the inner surface of the tube 1 by means of feet 4. The crucible 2 is encircled by a graphite ring 5 arranged within the tube 1 and provided externally with elongated projections 6. With these projections the lower part of the ring rests upon the inner wall of the tube 1, while there is a small amount of clearance between the tube wall and the upper projections.

Two high-frequency coils 7 and 8 each comprising a single turn and adapted to be connected to a high-frequency generator 17, are provided on the tube. They are interconnected mechanically (this connection is not shown) and their mutual spacing is slightly greater than the length of the graphite ring 5 measured in the axial direction. The two coils are preferably connected in series or parallel with one another in a manner such that they are traversed by the high-frequency current in the same sense producing additive fields.

To produce a molten zone in the material 3, the coils 7 and 8 are slightly energized by a high-frequency current of 1 m.c./s. supplied by the high-frequency generator, so that a high-frequency electromagnetic field is set up, the field strength of which has a minimum in the area corresponding to the ring 5. Now both coils are displaced so that by the forces exerted by the field the ring is moved to the place where the heated zone is to be produced in the material to be treated. The strength of the current traversing the coils is then increased so that the graphite ring is heated to a higher temperature and a molten zone 9 is produced in the material to be treated. The molten zone may be gradually displaced by moving the coils, the graphite ring following the displacement of the minimum of the field set up by the two coils. The projections 6 ensures satisfactory guiding of the ring in the tube 1. To promote a uniform movement against the action of the forces of friction between the projections 6 and the inner wall of the tube, the lower part of the inner wall may be coated with a thin layer of graphite. The static friction may also be eliminated by mechanically setting the tube 1 into vibration, for example by means of a not shown vibrating device.

The length of the ring determines the length of the molten zone 9. In order to obtain a zone of slight length, a short heating ring is required. To ensure satisfactory guiding of the ring in the tube 1 in the latter event, the projections 6 may be longer than the ring, so that they extend beyond the ring at one end or at both ends.

In a typical example for zone-melting gallium arsenide (GaAs), the graphite heating ring had an inner diameter of 26 mms., a thickness of 2 mms. and an axial length of 25 mm. The two coils each had a diameter of 60 mms., and were spaced apart a distance of 40 mms. The coils together moved at a rate of 0.5 mm. per minute, carrying the heating ring along with them. The invention would have special advantage in the zone-melting in a closed tube system, such as frequently used when treating semiconductor compounds.

FIGURE 2 is a graph in which the value of the components of the field strength of the electromagnetic field produced by these two coils is plotted vertically, said components being projected onto the direction of length of the charge and said field strength being measured along the axis of the coils 7 and 8, while the distance along the said axis is plotted horizontally. The line 10 shows the variation of this value when the coils 7 and 8 pass high-frequency currents of equal strength in equal senses. Points 11 and 12 indicate the values of the field strength components within the coils 7 and 8, respectively, at which points thes field strengths have maximum values. A point 13 indicates the minimum value of the field strength component at a point midway between the coils. Owing to the forces exerted on the heating ring, which is disposed between the coils, the ring will tend to find this minimum and hence will follow any displacement of this minimum on movement of the energized coils. However, the field strength in this minimum still has a comparatively high value, so that the ring can nevertheless absorb a considerable amount of energy from the field.

A broken line 14 shows the variation of the value of the field strength components if the two coils pass the same high-frequency current in opposite senses producing fields in opposition. In this event, the field strength has a value 0 at a point 15 midway between the coils. Although in this case the field produced by the coils will also tend to retain the ring in a position midway between the coils, the energy absorption in the ring from the field will be less than in the case to which the line 10 applies due to the smaller field strength in the area of the ring, so that the heating of the ring is less effective.

The invention is not restricted to the above-described method of, and apparatus for, zone melting of a material in a horizontal elongated crucible, but it may also be employed in other methods of moving-zone heat treatment, for example in the floating-zone method applied to a vertical rod of a material to be treated. In this method, the ring may be raised and lowered between two coils. The force of gravity acting upon the ring generally does not interfere with this movement, since in the energization of the two coils wihch is normally required to heat the ring, the coils will exert forces on the ring which generally far exceed the force of gravity acting upon the ring.

In principle, in zone melting of a vertically arranged rod, a single coil may be used in combination with a heavy or strengthened ring which is disposed above the coil in a position such that the lifting forces of the electromagnetic field of the coil are compensated by the force of gravity.

In principle, a number of coils greater than two may be used with interposed heating rings in order to produce a number of heated zones, for example a number of molten zones, in a single charge.

It should further be noted that the moving-zone heat treatment of materials need not be restricted to zone melting. The moving-zone heat treatment may also be used in manufacturing sintered rods of, for example, ceramic material and in the recrystallization of rods or wires of a material, for example metal, having a deformed crystal structure.

What is claimed is:

1. Zone-melting apparatus comprising means for supporting an elongated charge of a material to be subjected to a zone-melting treatment, an electrically-conductive heating ring surrounding an axial portion of the elongated charge, means permitting movement of the said heating ring in the direction of length of the charge, at least one high-frequency coil, a source of high-frequency currents, means connecting the source to the coil to energize the latter with high-frequency currents to establish a fluctuating electromagnetic field at the ring for inductively heating same and increasing its temperature to a value at which radiation from the ring will melt a transverse zone of the elongated charge, said high-frequency coil being located relative to the heating ring such that the region of maximum field intensity established by the coil is spaced from the ring center whereby the ring is generally located in a field region of lower intensity, and means for advancing the coil in the direction of length of the charge to cause the heating ring to be translated in a direction of a decreasing field gradient solely by means of the electromagnetic field forces and thus to cause the molten zone in the charge to be similarly advanced through the charge in its length direction.

2. Apparatus as set forth in claim 1 wherein the heating ring is constituted of graphite.

3. Zone-melting apparatus comprising a tubular enclosure, means for supporting an elongated charge of a material to be subjected to a zone-melting treatment within the enclosure, an electrically-conductive heating ring within the enclosure and surrounding an axial portion of the elongated charge, means permitting movement of the said heating ring in the direction of length of the charge within the enclosure, at least two, spaced high-frequency coils, a source of high-frequency currents, means connecting the source to the coils to energize the latter by high-frequency currents to establish a fluctuating electromagnetic field at the ring for inductively heating same and increasing its temperature to a value at which radiation from the ring will melt a transverse zone of the elongated charge, said high-frequency coils surrounding the tubular enclosure and being located at opposite ends of the heating ring such that regions of maximum field intensity established by the coils are at opposite ends of the ring whereby the ring is generally located in a field region of lower intensity, and means for simultaneously advancing both coils in the direction of length of the charge to cause the heating ring to be translated in the same direction solely by means of the electromagnetic field forces and thus to cause the molten zone in the charge to be similarly advanced through the charge in its length direction.

4. Apparatus as set forth in claim 3 wherein the heating ring is of graphite and fits within the tubular enclosure with a small amount of clearance whereby the said enclosure supports and guides the heating ring during its movement.

5. Apparatus as set forth in claim 4 wherein means are provided to direct the high-frequency currents through the two coils to produce additive fields.

6. A method of subjecting an elongated charge of a material to a zone-melting treatment, comprising the steps of surrounding an axial portion of the charge with an electrically-conducting heating ring, said ring being freely movable in the direction of length of the charge, establishing a fluctuating high-frequency electromagnetic field in the region of the heating ring such that the maximum field intensity is spaced from the ring center and the ring is generally in a field region of lower intensity and causing the heating ring to be inductively heated to a temperature at which a molten zone is established in a transverse region of the charge, and advancing the electromagnetic field in the direction of length of the charge and in the direction of a decreasing field gradient causing the ring to be simultaneously translated in the same direction solely by electromagnetic field forces and thus causing the molten zone to be similarly advanced through the elongated charge.

7. A method as set forth in claim 6 wherein the electromagnetic field established has spaced regions of high intensities and the same direction separated by a region of lower intensity, said latter region being established at the ring.

8. A method as set forth in claim 7 wherein the field is established by directing currents through a pair of spaced coils to produce additive fields, and the field is advanced by advancing the coils.

References Cited in the file of this patent

UNITED STATES PATENTS

| | | |
|---|---|---|
| 2,686,864 | Wroughton et al. | Aug. 17, 1954 |
| 2,826,666 | Cater | Mar. 11, 1958 |

FOREIGN PATENTS

| | | |
|---|---|---|
| 818,757 | Great Britain | Aug. 19, 1959 |

UNITED STATES PATENT OFFICE
CERTIFICATE OF CORRECTION

Patent No. 3,124,633                  March 10, 1964

Adrianus Martinus Jacobus Gerardus Van Run

It is hereby certified that error appears in the above numbered patent requiring correction and that the said Letters Patent should read as corrected below.

Column 1, line 38, for "evapoarted" read -- evaporated --; column 2, line 4, after "have" insert -- the --; same line 4, after "direction" insert -- and are additive --; same column 2, line 15, strike out "and are additive".

Signed and sealed this 14th day of July 1964.

(SEAL)

Attest:

ESTON G. JOHNSON
Attesting Officer

EDWARD J. BRENNER
Commissioner of Patents